United States Patent

Clark

[15] 3,645,290
[45] Feb. 29, 1972

[54] FLUID CONTROL DEVICE
[72] Inventor: Raymond Clark, Pewaukee, Wis.
[73] Assignee: Applied Power Industries, Inc., Milwaukee, Wis.
[22] Filed: Dec. 29, 1969
[21] Appl. No.: 888,669

[52] U.S. Cl............................................137/494, 251/262
[51] Int. Cl.............................................................F16k 17/06
[58] Field of Search.................137/494, DIG. 4; 251/335 R, 251/331, 368, 205; 138/46, 47

[56] References Cited

UNITED STATES PATENTS

| | | | |
|---|---|---|---|
| 2,021,731 | 11/1935 | Leins | 251/331 X |
| 2,348,083 | 5/1944 | McCabe | 251/335 X |
| 2,449,481 | 9/1948 | Hufferd et al. | 251/331 X |
| 2,888,034 | 5/1959 | Glegg | 251/368 X |
| 2,992,808 | 7/1961 | Burrit et al. | 251/386 X |
| 3,059,904 | 7/1963 | Thaning | 251/335 X |
| 3,447,569 | 6/1969 | Kreuter | 138/46 |

FOREIGN PATENTS OR APPLICATIONS

| 2,049 | 1860 | Great Britain | 251/331 |
|---|---|---|---|

*Primary Examiner*—M. Cary Nelson
*Assistant Examiner*—Richard Rothman
*Attorney*—John J. Byrne

[57] ABSTRACT

A pressure control valve having a passageway with first and second ends communicating with a pressure source and reservoir respectively. A portion of the passageway is formed with an annular portion of reduced cross section and receives an elastomeric member which is anchored to the housing at one end and which has a normal cross-sectional dimension at least equal to said cross-sectional dimension of said portion. Pressure-responsive means are provided on the other end of said member for stretching said member is reduce its cross-sectional dimension.

5 Claims, 3 Drawing Figures

PATENTED FEB 29 1972　　　　　　　　　　　　　　　　3,645,290

INVENTOR
RAYMOND CLARK

BY John J. Byrne
ATTORNEY

FLUID CONTROL DEVICE

An elastomeric member which changes in cross-sectional dimensions when subjected to stress is located across a passageway and fluid flow therethrough is controlled by varying the cross section dimension of the elastomeric member relative to the cross-sectional dimension of the passageway.

A principal objective of this invention is to provide a simple, effective fluid control device that is simple to manufacture, low in cost and rugged in performance.

Another important objective of this invention is to provide a fluid control device, utilizing an elastomeric material whose cross section contracts when the material is extended or elongated.

A further objective of the invention is to provide a control device, having the capability of handling a wide range of fluids and having one moving part.

A still further objective of the invention is to provide a fluid control device which will operate well in any plane in which it is disposed.

Another important objective of the invention is to provide a pressure relief valve having superior override characteristics with consistent performance.

A further objective of the invention is to provide a fluid control valve which provides tight shutoff characteristics for both gas and liquids and, with appropriate adjustments, has the ability to throttle or otherwise accurately control fluid flow.

These and other objectives of the invention will be more completely understood upon a reading of the following description taken with the drawings in which.

Figure 1:
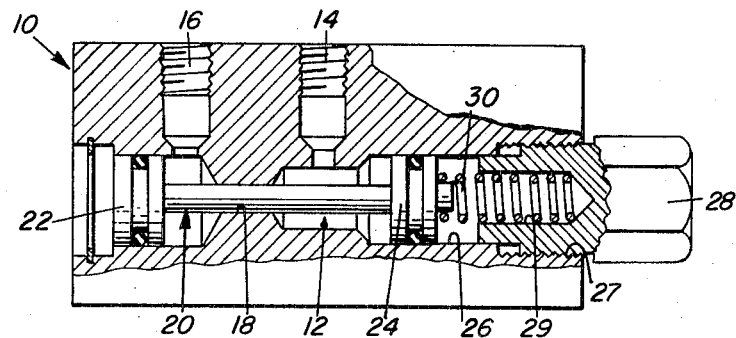
FIG. 1 is a longitudinal cross section of a pressure control embodiment of the invention.

Referring now to the drawing wherein like numerals indicate like parts, the numeral 10 refers to a housing having a passageway 12 therethrough. The housing is formed with a pressure port 14 communicating with the passageway 12 intermediate its length. A tank port 16 communicates with the passageway at a point spaced from port 14. The passageway 12 is reduced in cross section at 18 between the pressure and exhaust ports 14 and 16.

Disposed in reduced portion 18 is an elongated elastomeric member 20 having its first end anchored to an end cap 22. The cap 22 seals one end of the passageway 12. The other end of the elastomeric member 20 is affixed to a piston 24 which is slidably received in a cylindrical chamber 26 of passageway 12. Chamber 20 is enclosed by a cap 28. Cap 28 is threadably received in chamber 26 at 27. A compression spring 30 extends between a central cavity 29 of screwcap 28 and the piston 24.

In its relaxed position, the elastomeric member 20 isolates the pressure port 14 from the tank port 16. If the pressure in port 14 exceeds desired parameters, the piston 24 is moved to the right against the force of spring 30. The elastomeric member is elongated and is thereby stretched to a cross section less than the cross section defined by the inner periphery of port 18. This opens a fluid path to exhaust port 16 until the pressure is less than the bias of spring 30. It, of course, can be seen that the level at which pressure release occurs is variable by threadably positioning adjustment cap 28.

Figure 2:
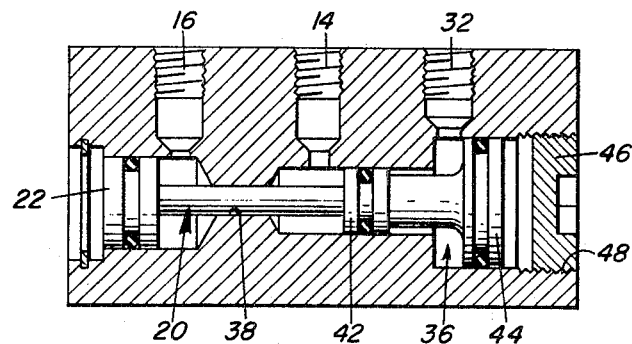
FIG. 2 is a longitudinal cross section of a flow control valve embodiment of the invention.

The principles of this invention can also be utilized in a flow control valve operable under the effect of pilot pressure. In the FIG. 2 embodiment, a passageway 36 is reduced in cross section at 38. The elastomeric member 20 extends through the orifice 38. On end of the elastomeric member 20 is affixed to an end cap 22 which seals one end of the passageway. The other end of the elastomeric member 20 is affixed to a piston 42 slidable within the passageway 36 between a pilot pressure orifice 32 and the pressure port 14. The outer end of piston 42 is affixed to a control piston 44. This end of passageway 36 is enclosed by a plug member 46 which is threadably received at 48.

In its relaxed position, the elastomeric member 20 is sized to block the constricted area 38. When pilot pressure in port 32 is sufficient to move the control piston 44 to the right, the elastomeric member 20 is extended and thus reduced in cross section. An annular fluid passageway is formed between orifice 38 and the elastomeric member or cord 20. When the pilot pressure is reduced, the natural resiliency of the cord will cause it to contract and to assume its blocking position.

Figure 3:
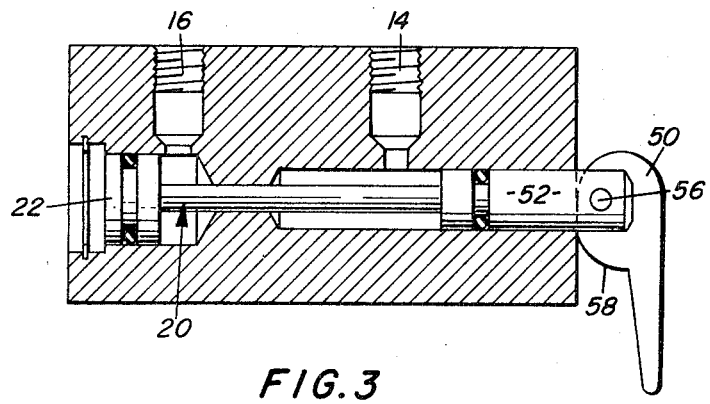
FIG. 3 is a longitudinal cross section view of a manually controlled valve embodiment of the invention.

The FIG. 3 construction is similar to FIG. 1 except that a control handle 50 and a piston 52 replace the piston 24 and the spring 30. Here, fluid is permitted to flow from pressure to outlet upon pushing the handle 50 to stretch the elastomeric member 20. The handle 50 is pivotally attached to piston 52 at pin 56. The handle is formed with a cam surface 58. When handle 50 is moved clockwise, piston 52 is moved to the right and the cord 20 is stretched. The embodiment of FIG. 3 can be used to control a variety of fluids, from high-pressure environments to simple household applications.

In a general manner, while there have been disclosed effective and efficient embodiments of the invention, it should be well understood that the invention is not limited to such embodiments as there might be changes made in the arrangement, disposition, and form of the parts without departing from the principle of the present invention.

I claim:

1. A pressure control valve comprising a housing having a passageway therethrough having a first end thereof communicating with the pressures of a hydraulic system and a second end thereof in communication with reservoir pressures, an inner valve surface along a portion of said passageway, an elongated elastomeric member in said portion having a cross-sectional dimension equal to the cross-sectional dimension of said inner valve surface while in a relatively relaxed position to thereby seal said passageway, means fixing a first end of said member at said first end of said passageway, a piston slidably received in the other end of said passageway and being affixed to the second end of said member.

2. The pressure control valve of claim 1 wherein a threaded cap member encloses one end of said passageway and a compression spring is disposed between said cap and said piston.

3. A valve for the control of fluids comprising a housing having an inlet port and an outlet port, a passageway extending between said inlet port and said outlet port, an elastomeric member disposed in said passageway and having a cross-sectional area sufficient to block said passageway, anchor means securing one end of said elastomeric member with respect to said housing, means connected to the other end of said elastomeric member and externally thereof for applying an outward tension to elongate said member a sufficient length to reduce its cross-sectional dimension an amount less than that of said passageway and wherein said inner surface of said passageway compressively engages said elastomeric member prior to its elongation.

4. The valve of claim 3 wherein said elastomeric member is solid.

5. The valve of claim 3 wherein said means for applying an outward tension to said member includes a cam lever, and means for mounting said lever for pivotal movement.

* * * * *